Nov. 28, 1967
E. C. LUCKENBACH
3,355,380
CONTROLLING CATALYST HOLDUP IN CONVERSION OF HYDROCARBONS
Filed July 27, 1965
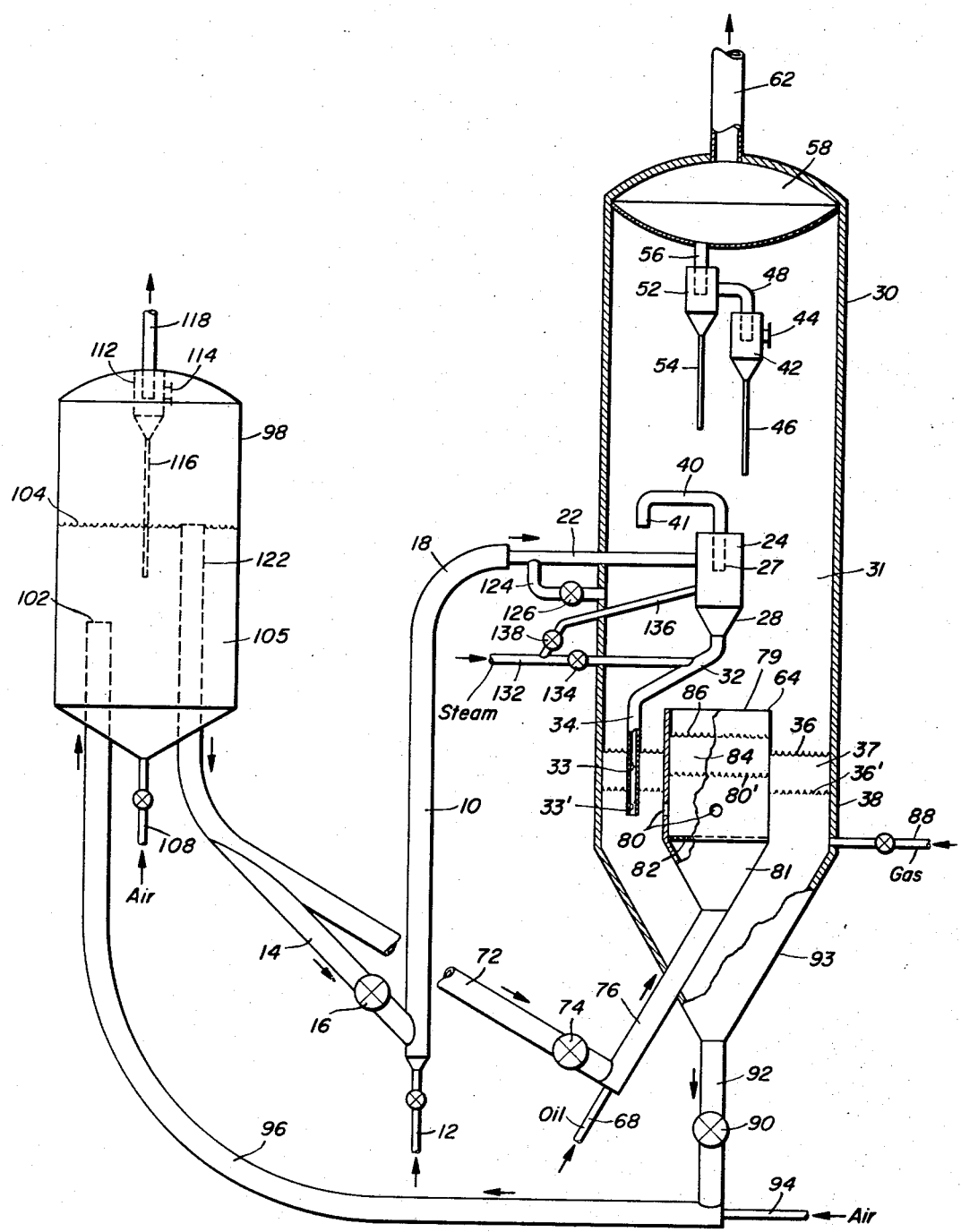
EDWARD C. LUCKENBACH  INVENTOR
BY
PATENT ATTORNEY

3,355,380
CONTROLLING CATALYST HOLDUP IN CONVERSION OF HYDROCARBONS

Edward C. Luckenbach, Mountainside, N.J., assignor to Esso Research and Engineering Company, a corporation of Delaware
Filed July 27, 1965, Ser. No. 475,085
10 Claims. (Cl. 208—153)

This invention relates to the catalytic conversion of hydrocarbons and more particularly relates to catalytic cracking of hydrocarbons using a finely divided cracking catalyst.

Fluid bed cracking reactors and transfer line reactors are known. Both of these reactors have advantages and disadvantages. One main disadvantage or shortcoming of the transfer line reactor is the lack of control over catalyst hold-up in the zones in which the reaction occurs at the gas velocities usually used. The catalyst hold-up is dependent on catalyst circulation rate but the catalyst circulation rate is not a controllable variable in normal unit operation. As a result, changes in catalyst activity or feedstocks will directly affect the oil conversion obtained in transfer line reactors. Oil conversion can be adjusted by changes in fresh catalyst addition rates and reactor temperature, but these changes will usually result in large economic debits to catalytic cracking unit operations.

The intrinsic low catalyst hold-up of the transfer line reactors has limited their usefulness to rather inflexible plant operations regarding feed quality, temperature and oil feed conversion.

In the present invention an apparatus and method are disclosed for securing flexibility of catalyst hold-up in a transfer line reactor system and thereby the flexibility of cracking severity in the transfer line reactor cracking unit. In one form of the present invention a fluid bed reactor is used in combination with a transfer line reactor which has its operation modified. The dilute phase above the dense fluid bed contains entrained catalyst particles which are added to those from the transfer line reactor.

In the conventional transfer line reactor operation to minimize hold-up the catalyst solids/gas stream from the outlet of the reactor enters a rough cut cyclone or cyclones where essentially all of the catalyst is removed from the gas or vapor stream stopping the catalytic reaction. In one form of the invention the rough cut cyclone separator or separators are housed in a larger vertically arranged cylindrical cyclone-stripper vessel which may contain a dense fluidized bed catalytic conversion zone surrounded by a stripping zone in its lower portion and a sufficient number of conventional cyclone separators at the upper portion to remove entrained catalyst particles so that there will be little carryover of catalyst particles in the vapors and gases going to the frictionator.

The rough cut cyclone separator system is arranged about halfway between the top and bottom of said cylindrical vessel. The dilute phase of catalyst above the dense fluidized catalytic conversion zone surrounds the rough cut cyclone separator system and extends approximately up to the conventional cyclone separators at the upper portion of the cyclone-stripper vessel.

This arrangement fixes catalyst hold-up of those vapors subjected to cracking in the transfer line so that this hold-up is a function only of catalyst circulation rate for a given oil feed rate to the transfer line reactor. Little or no flexibility exists for increasing catalytic conversion of the oil feed. Reactor temperature could be raised by raising the regenerator temperature, but sometimes higher reactor temperatures cannot be tolerated or undesirable product yield distributions will result.

According to the present invention, the catalyst hold-up in the transfer line reactor system can be controlled by reducing the efficiency of the rough cut cyclone system and when this is done some of the catalyst particles are carried along with the reaction products or reactor products around the rough cut cyclone separator system to by-pass the rough cut cyclone separator system and so avoid separation of catalyst solids from the reaction vapors. The by-passed stream of solids and reaction vapors is passed directly into the cyclone-stripper vessel into the dilute catalyst phase above the dense fluid bed level so that additional catalyst particles are supplied to the by-passed stream and additional cracking takes place.

In this way further catalytic conversion of the partially converted hydrocarbon oil feed is accomplished under controlled conditions in the stripper-cyclone elongated vessel. In other words, a portion of the catalyst and reaction products leaving the outlet of the transfer line reactor as a suspension is diverted around the rough cut cyclone separator or separators and passed to the stripper-cyclone separator vessel into which the rough cut cyclone separator or separators normally discharge so that the reaction time for the conversion of the oil is extended under controlled conditions.

In the catalytic cracking of hydrocarbons, for example, a slip stream of cracking catalyst particles and gas oil is taken from the transfer line reaction zone outlet and is by-passed around the rough cut cyclone separator or separators and passed into the space around the rough cut cyclone separation system for admixture with catalyst particles in the dilute phase so that the reaction time in the presence of catalyst particles is controlled and extended beyond the outlet from the transfer line reactor.

Alternatively, the efficiency of the rough cut cyclone separator or separators can be reduced by injecting steam into the cyclone separator or separators or by raising the catalyst level in the diplegs of the rough cut cyclone separator system into the rough cut cyclone separator or separators. With this form of the present invention, catalyst particles are carried out of the rough cut cyclone separator or separators along with the reaction products and further conversion is accomplished under controlled conditions in the stripper/cyclone separator vessel into which the effluent from the cyclone separator system normally discharges.

According to the present invention, the catalyst hold-up can be controlled in a transfer line reactor system which is not possible with present cracking units other than going to a modified fluid bed operation which seriously complicates equipment configuration and design and in which it is very difficult to obtain the low catalyst hold-up which can be obtained in a transfer line. Process yield debits would be incurred if a bed had to be used where a transfer line is desired. Thus, with this invention variation in catalyst hold-up in a transfer line reactor system is possible independent of catalyst circulation feed rate or reactor temperature.

In one instance, the catalyst activity and conversion of oil feed in a unit were below design figures. The catalyst activity and conversion can be brought up to design figures by adding fresh cracking catalyst to the unit which would be costly. It would be preferable to increase the catalyst hold-up in the transfer line reactor system to compensate for the low activity and conversion. In one instance it was desired to increase the hold-up by about 60% in order to incur no economic debit.

In the drawing the figure represents one form of apparatus adapted for practicing the present invention.

Referring now to the drawing, the reference character 10 designates a vertically arranged elongated cylindrical transfer line into which preheated hydrocarbon oil with or without steam is introduced through line 12. The oil feed may be gas oil or mixtures containing gas oil but other oil feeds may be used. The line 12 opens into the bottom portion of the transfer line reactor. The oil is preferably injected through nozzles into the bottom of the transfer line reactor so as to atomize and vaporize the oil. Regenerated hot catalyst is introduced into the bottom of the transfer line 10 from standpipe 14 provided with a control valve 16 for controlling the amount of catalyst being introduced into the transfer line reactor.

The oil feed is mixed with the catalyst particles to form a suspension and the suspension of hydrocarbon oil feed vapors and catalyst particles pass up through the transfer line reactor to effect cracking of the hydrocarbon oil feed. During the cracking step coke or carbonaceous material is laid down on the catalyst particles.

The suspension passes upwardly through the transfer line reactor 10 at a velocity between about 6 and 50 feet per second. If desired, a distribution grid may be provided at the bottom of the transfer line reactor to distribute the steam and oil vapors. The catalyst hold-up in the transfer line reactor 10 using conventional silica-alumina cracking catalyst of a size between about 10 and 300 microns with an average particle diameter of about 60 microns may be between about 2 and 12 tons. The pressure in the transfer line reactor may be between about 5 and 35 p.s.i.g. The cracking temperature in the transfer line reactor 10 is between about 825° F. and 1150° F. with the temperature at the inlet being higher than at the outlet from the transfer line reactor. The space velocity in reactor 10 is between about 12 and 150 w./hr./w. and the catalyst to oil ratio by weight is between about 3 and 25. The length to diameter ($L/D$) of the reactor 10 may be between about 50 and 4.

The cracked or reaction products and catalyst particles are passed through the upper horizontal portion 22 of the transfer line reactor and into a rough cut cyclone separator or separators 24 to separate catalyst particles from partially converted vaporous hydrocarbon reaction products. While only one cyclone separator 24 is shown in the drawing, there are preferably two or more each having one or more diplegs. The rough cut cyclone separator is only a moderately efficient cyclone separator which permits some of the catalyst solids to pass through with the reactor vapors to the dilute catalyst phase 31 presently to be described. The efficiency of the rough cut cyclone separator is between about 50 and 98%. In the rough cut cyclone separator the main cone shown at 28 is somewhat shorter than that of the usual or conventional cyclone separator. The bottom outlet of the inner extension of the pipe 27 within the separator 24 is shown at about the level of the bottom of the horizontal portion 22 of the transfer line reactor. The horizontal portion 22 is of a smaller diameter than the vertical section of reactor 10. Other types of rough cut cyclone separators or conventional cyclone separators may be used. The rough cut cyclones are available on the market from cyclone separator manufacturers and are not a special design.

The rough cut cyclone separator system is arranged in an elongated vertically arranged cylindrical cyclone-stripper vessel 30. The rough cut cyclone separator system is arranged about halfway between the top and bottom of the vessel 30 and above a fluid bed reactor presently to be described. There is a dilute phase of catalyst 31 above the fluid bed reactor and this extends into the upper portion of vessel 30 and surrounds the rough cut cyclone separator system 24.

The separated catalyst particles are withdrawn from the bottom of rough cut cyclone separator 24 through one or more diplegs which comprise line 32 which extends downwardly at a large angle from the horizontal, and then is formed into vertically arranged line 34 which extends down from line 32 for delivering separated catalyst solid particles from line 32 preferably to below the level 36 of fluidized solids bed 37 in the annular stripping section 38. Normally there is a catalyst level 33 in the vertical dipleg 34. From the bottom of the stripping section 37 the spent and stripped catalyst particles are passed to a regenerator hereinafter to be described in greater detail.

The partially converted hydrocarbon reaction products leaving the rough cut cyclone separator or separators 24 upwardly through inner pipe 27 are passed through horizontal outlet line 40 and then downwardly through the open ended portion 41 which has its outlet pointing downwardly so that vaporous reaction products will first pass down and then up and in the change of direction will effect separation of catalyst solids from reaction vapors which pass upwardly in vessel 30. The reaction products from line 40 are discharged into the dilute catalyst phase 31 in the vessel 30 which surrounds rough cut cyclone separator system 24.

In the drawing the outlet end 41 is shown directly above the horizontal portion 22 of the transfer line reactor but in actual construction the outlet end 41 would be to one side of the horizontal portion 22 to permit free egress of the solids and vapors from line 40 from the rough cut cyclone separator 24. The catalyst particles and partially converted hydrocarbon reaction vapors leaving the rough cut cyclone separator system through line 40 are admixed with catalyst particles in the dilute or disperse phase 31 above a dense fluid catalyst bed in a conversion zone presently to be described where the cracking or conversion of the partially converted hydrocarbons is completed.

The reaction vapors leaving line 40 still contain entrained catalyst solids and the vapors in passing upwardly are passed through a second cyclone separator system including first cyclone separator 42, which is of conventional design and an efficient cyclone separator having an inlet 44 for the vapors containing entrained catalyst solids. The efficiency of the conventional cyclone separatory 42 is above about 98%. In the cyclone separator 42, the vapors are separated from catalyst solids which pass downwardly through dipleg 46 which preferably extends into the fluidized bed of solids in the stripping section 38 (not shown).

The separated vapors pass overhead through line 48 and to a second conventional cyclone separator 52 having essentially the same as or improved efficiency over separator 42, wherein catalyst solids are separated and preferably returned through dipleg 54 to the fluidized solids in the stripping section 38. The separated vapors pass upwardly through the outlet line 56 into a plenum chamber 58 and then out through the top outlet line 62 for passage to a fractionator (not shown) for separating gasoline and other fractions from cycle oil or gas oil which is recycled to another cracking zone in the unit to be described now.

A second hydrocarbon conversion vessel 64 including a dense fluidized turbulent bed of catalyst particles is arranged in the lower portion of the elongated cylindrical vessel 30. Vessel 64 is of smaller diameter than vessel 30 and is concentric therewith to form annular stripping section 38. This conversion vessel 64 is cylindrical and is used to convert a more refractory stock such as cycle stock or naphtha etc. Naphtha is cracked in order to make light gases such as butylenes for alkylation. Also a thermal naphtha may be "treated," so that gum stability is improved. This is all done at low carbon yield so that the regeneration section of the unit is not taxed. The uncracked naphtha has essentially the same characteristics after it has passed through the conversion zone with regard to API gravity, volatility, octane etc.

The cycle oil or other refractory hydrocarbon oil feed is passed to cracking zone or vessel 64. This oil feed in liquid or vapor state is passed through line 68 with or without added steam and introduced into the bottom portion of line 76 where it is mixed with hot regenerated catalyst particles introduced into line 76 from standpipe 72 having a control valve 74 for controlling the amount of catalyst introduced into the bottom portion of line 76. The hot regenerated catalyst is mixed with the oil feed for forming a vapor-solids suspension which is passed upwardly through line 76 into the cylindrical reaction vessel 64 which is of larger diameter than inlet line 76 and has its upper end 79 open. The upper end of the inlet line 76 is flared outwardly at 81 to form the larger diameter reactor 64.

Preferably at the bottom of the reactor 64, there is provided a distribution grid 82 through which the vaporized oil and catalyst particles pass to form a dense turbulent fluidized catalyst bed 84 having a level indicated at 86 which is preferably below the upper end of reactor vessel 64. The superficial velocity of the gases passing upwardly through the reaction vessel or zone 64 is selected to be between about 0.3 and 4 feet per second to form a dense fluidized bed having a density between about 35 and 10 pounds per cubic foot, when the catalyst is conventional silica-alumina cracking catalyst having a particle size between about 10 and 300 microns with most of the catalyst being between 20 and 80 microns. Other cracking catalysts such as silica-magnesia, silica-zirconia, activated clays etc. may be used.

The cracking temperature in fluid bed reactor 64 is between about 825° F. and 1050° F., the pressure between about 5 and 35 p.s.i.g. and the space velocity is between about 12 and 0.5 w./hr./w. The catalyst to oil ratio by weight in line 76 is between about 2 and 20. During the cracking operation coke or carbonaceous deposits form on the catalyst particles. There is a dilute phase 31 of catalyst particles above the level 86 of the dense fluidized bed of catalyst particles containing between about 0.05 and 1.0 pound per cubic foot and the total weight of dilute phase catalyst above the catalyst level 86 in vessel 30 is between about 0.01 and 15 tons. The catalyst hold-up in reactor 64 is between about 2 and 100 tons.

The reaction vessel 64 is provided with an open upper end 79. One or more holes 80 are provided in the wall of the cylindrical vessel 64 at a level 3 to 15 feet above the distributor grid 82 where the height of the vessel 64 is between ten and forty feet. The hole or holes 80 provide means for catalyst particles to flow from the reactor vessel 64 to the surrounding annular stripping zone 38. As there is a pressure drop in going through the holes 80 the level 36 of the catalyst bed in the stripping section or zone 38 is lower than the catalyst bed level 86 in vessel 64. The outer wall of the stripping zone or section 38 is formed by the cyclone separator-stripper cylindrical vessel 30.

The level 86 in cracking vessel 64 may be varied by valve 90 in standpipe 92 into which spent catalyst flows from the stripping section or zone 37. Operation of valve 90 changes the level of catalyst in the stripping zone and this in turn changes the level 33 in dipleg 34 of rough cut cyclone separator 24. When the catalyst level 33 goes down it is shown at 33' in dotted lines. With this arrangement the level of catalyst in the reaction vessel 64 can be controlled by variation of the catalyst level 36 in the stripping zone 38 which in turn is controlled by valve 90 in standpipe 92 presently to be described. As the level of the catalyst in the reactor 64 can be varied, the catalyst hold-up in the dense phase 84 will vary. The dilute phase volume 31 will be reduced by the increased volume occupied by bed 84. As a modification, a lower catalyst level 80' is shown in dotted lines in vessel 64 and a corresponding lower level 36' in the catalyst level in the stripping zone 37.

As an alternative modification, the hole or holes 80 in the wall of vessel 64 can be omitted to leave an imperforate wall of the vessel 64 and the fluidized catalyst in the reaction zone or vessel 64 can then overflow the open end 79 of vessel 64 and can flow into the stripping zone or vessel 37. The preferred form of the invention is that shown in the drawing with the stripper holes 80 as this provides a structure and a process where the level 86 of catalyst bed in vessel 64 can be controlled and varied and hence the conversion of the hydrocarbons can be varied as desired or if desired.

The vessel 30 contains the rough cut cyclone separator system 24 and the primary and secondary conventional cyclone separators 42 and 52 and the stripping section 38. Stripping gas such as steam is introduced into the bottom portion of the stripping section 38 through one or more lines 88. The purpose of adding the stripping gas is to remove volatile hydrocarbons from the catalyst particles which are then removed from the bottom of the stripping section 38 through standpipe 92 provided with control valve 90. The stripping gas and stripped out vapors pass up in the dilute phase 31.

It is to be noted that the spent or coke-containing catalyst particles from both the transfer line reactor 10 and cylindrical vessel 64 are passed into and collected in the stripping zone 38. From the bottom of the stripping zone and bottom of vessel 30 the spent catalyst particles are funnelled into standpipe 92 by the inverted conical bottom 93 of vessel 30. After having passed through control valve 90, the spent catalyst particles are mixed with air or other combustion supporting gas introduced into the bottom standpipe 92 below valve 90 through line 94. The catalyst air suspension or mixture is passed through line 96 for introduction into the regenerator 98 which is provided for burning off carbon from the catalyst particles formed during the cracking reaction. In the cracking reaction carbonaceous material is formed on the catalyst particles and this material is burned off in the regenerator and, at the same time, heats the catalyst particles which are then returned to the reaction zones as will be presently described.

The line 96 extends up into the regeneration zone 98 for a short distance above the bottom of the regeneration zone 98 and has its outlet end 102 submerged in the dense fluidized bed of catalyst solids 105 in the regenerator 98 to be below the level 104 of the dense fluidized turbulent catalyst bed 105. Additional air for regeneration is preferably added into the bottom portion of the regenerator 98 through line 108. The superficial velocity of the gases passing upwardly through the regeneration vessel 98 is selected to maintain the catalyst particles as a dense turbulent fluidized bed having a density between about 10 and 35 pounds per cubic foot.

Regeneration gases leaving the dense fluidized bed 105 in the regenerator vessel 98 contain entrained catalyst particles and these are recovered by passing the regeneration gases through one or more cyclone separators to recover the entrained catalyst solids. Any number of cyclone separators may be used. In the drawing, one conventional efficient cyclone is shown at 112 which is arranged in the upper portion of the regeneration vessel 98 and which has an inlet 114 for the combustion or regeneration gases containing the catalyst solids. The separated solids are withdrawn from the cyclone separator through dipleg 116 which preferably extends below the level 104 of the fluid bed of catalyst solids in the regeneration vessel 98 and the separated flue gases pass overhead through line 118 and may be passed through waste heat boilers or the like to recover heat from the regeneration gases.

As above pointed out, the conventional transfer line reactor has a main disadvantage in that there is no control over the catalyst hold-up which accomplishes the cracking in the transfer line reactor system at the gas velocity usually used. The present invention is intended to overcome this major disadvantage and this is done by providing by-pass line 124 which preferably communicates with the top horizontal line 22 of the transfer line reactor beyond the 90° bend 18 and as shown opens into the bottom part of the horizontal section 22 of the transfer line reactor 10. The by-pass line 124 can open into the top or side of the section 22 as the point of entry is not critical. A control valve 126 is provided in by-pass line 124 which leads into about the middle of the vertically arranged stripper-cyclone vessel 30.

When it is desired to increase conversion and catalyst hold-up in the transfer line reaction system, the valve 126 is opened to the desired extent to by-pass some of the suspension of catalyst solids in the hydrocarbon vapors being cracked from the horizontal section 22 around the rough cut cyclone separator 24 and into the stripper-cyclone separator vessel 30 about halfway up and above the level of catalyst 36 in the stripping section 38. With the present invention it is possible to add more catalyst to the reactor system by adding more catalyst holdup downstream of the transfer line. The catalyst hold-up then is considered as extending beyond the transfer line into vessel 30 and includes the amount of catalyst in the dilute phase 31 above the dense bed in reactor 64 and in the large vessel 30 which contains the reactor 64 and the cyclone separators 42 and 52. The weight of catalyst by-passed from the main stream in line 22 around the rough cut cyclone separator system 24 is between about 0 to 80% by weight of the main stream of catalyst in line 22.

Regenerated catalyst is withdrawn from the regeneration vessel 98 by standpipe 122 which extends up through the bottom of the regeneration vessel to an upper portion of the regenerator vessel 98 and at a higher level than the outlet line 102 of line 96 which introduces the spent catalyst particles into the regeneration zone or vessel 98. The upper end of the standpipe 122 is open and determines the level 104 of the dense turbulent fluidized bed of solids 105 in the regeneration vessel 98. Hot regenerated catalyst from standpipe 122 is divided into two parts as shown in the drawing, with one portion being fed to the standpipe 14 for catalyst feed to the transfer line reactor 10, and the other stream being passed through standpipe 72 for feeding hot regenerated catalyst to the fluidized bed reactor 64.

The efficiency of the rough cut cyclone separator 24 can also be reduced by introducing steam through line 132 controlled by valve 134 into the dipleg 32 of rough cut cyclone separator to increase the velocity of gas in the dipleg of the cyclone separator and to interfere with the downflowing solids in the dipleg forcing them to remain in the separator 24 and eventually to be passed out of the separator through line 40. The normal gas velocity in separator 24 is between about 25 and 80 ft./sec. and there is normally very little gas velocity in the dipleg.

When steam is injected so that the velocity in the dipleg is increased to between 1 and 10 feet per second, the efficiency of the cyclone separator will be reduced and catalyst losses to the dilute phase through duct 40 are increased.

Or the level of catalyst in the diplegs can be raised into the main cyclone separator housing of the cyclone separator 24 by providing a valve (not shown) in each dipleg 34, or by raising the catalyst level in the stripper section 37 by adjustment of valve 90 in the standpipe 92. The stripper catalyst level must be increased so that the level in the dipleg or diplegs 32 is between 3 feet below and 1 foot above the junction of the dipleg 32 and the main cone of the rough cut cyclone separator in order to reduce the efficiency of the rough cut cyclone separator. In this case the cyclone separator cone has a length of approximately four feet and a diameter of approximately five feet.

Or the efficiency of the rough cut cyclone separator 24 may be reduced by closing valve 134 and introducing steam from line 132 into line 136 having valve 138 open. Line 136 discharges into the body of the cyclone separator 24 and the gas introduced increases the velocity of the solids suspension passing through the cyclone separator 24.

The temperature during regeneration in the regeneration vessel 98 may be between about 1050° and 1200° F. and the pressure in the regeneration vessel 98 may be between about 2 and 30 p.s.i.g. If desired or if necessary, the temperature in the regeneration vessel 98 may be increased by introducing combustible oil, such as torch oil, into the regeneration vessel 98 and into the dense fluidized bed 105.

The catalyst hold-up in transfer line reactor system 10 is calculated or taken as the sum of the weight of catalyst particles in the transfer line reactor and the weight of catalyst particles in vessel 30 above the gas outlet of the rough cut cyclone 24. Where by-pass line 124 is partly opened, the catalyst hold-up in the transfer line reactor system also includes the catalyst particles beyond the outlet of line 124 in dilute phase 31, and includes the catalyst hold-up increase in dilute phase 31 due to the catalyst introduced through line 124.

In one case, for example, the catalyst hold-up in the transfer line reactor 10 is 6 tons and the hydrocarbon conversion is below the desired figure and the catalyst activity is also below the desired figure. Normally in a fluid bed reactor the catalyst hold-up in the dilute phase 31 is between about 5 and 10 tons depending on the superficial velocity of the upflowing gaseous material in the reactor. However, in a conventional transfer line reactor system the catalyst hold-up in the dilute phase 31 is essentially zero as the rough cut cyclone 24 removes essentially all of the catalyst from the gas stream flowing in line 22. If about 50% of the total catalyst-oil vapor suspension is by-passed through by-pass line 124, the overall reactor catalyst hold-up would be increased by about 7 tons and this increase in catalyst hold-up would increase the catalyst activity and conversion for the transfer line reactor 10 to the desired level.

The catalyst hold-up of the present invention is also intended for use with a reactor system wherein only a transfer line reactor is provided in which the catalyst hold-up is controlled in a manner or ways similar to those above described. In this case the rough cut cyclone separator of the transfer line reactor empties into a well stripping zone where the catalyst particles are preferably in a dense fluidized state and stripping gas is passed upwardly through the stripping zone. Stripped catalyst particles are withdrawn as a dense fluidized stream from the stripping well either as a bottom stream or a side-stream. Instead of a dense phase catalyst stripping zone, a dilute phase stripping zone may be used and the diplegs of the rough cut cyclone separator or separators are provided with trickle valves or the like.

The dipleg or diplegs 32 may also be provided with dampers or valves to increase the level of catalyst particles in the diplegs up into the rough cut cyclone separator 24 itself. The by-pass line 124 is used to control the amount of catalyst particles by-passing the rough cut cyclone separator or separators and being discharged into the vessel into which the rough cut cyclone separators discharge.

As a specific example of a catalytic cracking unit of the present invention, the following details are given for a cracking unit of about 45,000 b./d. total feed of gas oil being introduced through line 12 and which includes no cycle oil. The transfer line reactor 10 is about 65 feet long from the bottom of the transfer line reactor 10 where the oil is injected through line 12 to the inlet end of the horizontal section 22 which is about 30 feet long and which discharges into the rough cut cyclone separator 24. The length to diameter ($L/D$) of the transfer line reactor is about 12. The vertical section of the transfer line reactor 10 is about 66 inches in internal diameter for the entire length of the vertical section. The horizontal line 22 is approximately 42 inches in diameter. The line 22 is smaller in diameter than the vertical section of reactor 10 to increase the gas velocity in line 22.

About 7000 b./d. of refractory oil such as virgin naphtha having a boiling range between about 100 and 300° F. are introduced into the line 76 through line 68 for passage to fluid bed reactor 64. The density of the fluidized catalyst mixture 84 in fluid bed reactor 64 is 32 pounds/cu. ft., the temperature about 950°–990° F., the pressure about 24 p.s.i.g., the w./hr./w. about 1 and the catalyst to oil ratio in inlet line 76 about 12. The hold-up of catalyst in the reactor 64 is 37 tons and in the dilute phase 31 above the fluid bed level 86 is 1 ton. The dilute phase 31 extends above the rough cut cyclone separator system 24.

About 45 tons per minute of conventional regenerated silica-alumina catalyst containing 13% of alumina at a temperature of about 1120° F. are withdrawn from the regenerator vessel through line 122 and about 37.5 tons per minute of the regenerated catalyst are passed through standpipe 14 and the transfer line reactor 10 and the rest of the regenerated catalyst passes through line 72 and the fluid bed reactor 64. The oil feed temperature in inlet line 12 is about 750° F. and about 3000 pounds of steam per hour are introduced into the bottom of the transfer line reactor 10 through the same line 12. The catalyst has a particle size distribution of about 13% of 0–40 microns, about 77% of 40–80 microns and about 10% of 80+ microns.

The density of the catalyst-oil vapor and steam mixture in the transfer line reactor 10 averages about 5 pounds per foot being 8#/c.f. at the bottom and 4#/c.f. at the top. The velocity of the upflowing catalyst-oil mixture or suspension in transfer line reactor 10 averages about 17 feet per second being 9 f./s. at the bottom and 20 f./s. at the top.

The hold-up of the catalyst in transfer line reactor 10 is about 5 tons and the catalyst circulation is about 37.5 tons per minute. The space velocity w./hr./w. (weight of oil per hour per weight of catalyst) is about 56. The catalyst-to-oil weight ratio of the oil fed into the transfer line reactor 10 is about 8. The reaction temperature in the transfer line at the entrance to line 22 is about 970° F.

The steam introduced into the stripping section 38 through line or lines 88 passes upwardly through the stripping section at a superficial velocity of about 1.0 feet per second displacing entrained and/or adsorbed hydrocarbons from the catalyst particles. The temperature in the stripping vessel 26 is about 970° F. The density of the catalyst particles undergoing stripping in the stripping section 38 is about 33 pounds per cubic foot. About 45 tons per minute of stripped catalyst are introduced into the regeneration vessel 98 from standpipe 92.

The regeneration vessel 98 has an internal diameter of about 42.5 feet, a height of about 72 feet and operates at a temperature of about 1120° F. About 60,000 standard cubic feet of dry air per minute are introduced into the bottom of the regeneration vessel 98 through line 108. The superficial velocity of the air and gases passing up through the regeneration vessel is about 1.7 feet per second. The density of the catalyst mixture in the regeneration vessel 98 is about 28 pounds per cubic foot. The catalyst hold-up in the regeneration vessel 98 is about 250 tons.

In the above example with valve 126 in by-pass line 124 closed so that all the catalyst from the transfer line reactor passes through the rough cut cyclone separator system 24, the conversion of the gas oil feed having a boiling range of 450° F. to 1000° F. introduced into line 68 is 50% to products boiling below 430° F. and coke and the activity of the catalyst was 22% of fresh catalyst.

The valve 126 in by-pass line 124 is opened a sufficient amount to divert or by-pass 30 tons per minute around cyclone separator 24 to the dilute phase 31. This diverted catalyst is added to the dilute phase 31 which has a catalyst hold-up of about 1 ton so that the total catalyst hold-up is about 8 tons in the dilute phase and the total reaction hold-up in the transfer line system is about 13 tons. The conversion is increased to 58%.

A similar increase in dilute phase hold-up can be obtained by adding sufficient steam through line 132 so that the velocity in the dipleg is increased to about 3 feet per second. In this case four rough cut cyclones 24 are provided and each has a dipleg 2′2″ in diameter, thus about 8000#/hr. of steam will result in about 8 tons of dilute phase hold-up.

A similar dilute phase hold-up increase can be obtained by increasing the catalyst level 36 in the stripper 38 so that the level of the catalyst 33 in the dipleg 34 is in the portion of the dipleg 32 and is about one foot above to two feet below the junction of dipleg 32 and the main cone of the rough cut cyclone 24 where the cone has a length of four feet and a diameter of five feet.

What is claimed is:

1. A process for converting hydrocarbons which comprises passing a relatively dilute suspension of catalyst particles in hydrocarbon vapors as an upflowing stream through an elongated conversion zone, passing a portion of the suspension from the exit end of said elongated conversion zone to a separation zone arranged in an enlarged zone to separate spent catalyst particles from partially converted hydrocarbon vapors, passing another portion of the suspension through a by-pass line as a by-pass stream around said separation zone and into said enlarged zone to separate spent catalyst particles from partially converted vapors, combining partially converted hydrocarbon vapors from said separation zone and from said by-pass line, passing said combined partially converted hydrocarbon vapors upwardly in said enlarged zone where conversion is completed and passing converted hydrocarbon vapors through a second separation zone to recover converted hydrocarbon vapors from entrained catalyst particles.

2. A process according to claim 1 wherein the catalyst hold-up in said enlarged conversion zone is varied by changing the amount of catalyst particles passed as a by-pass stream around said first separation zone.

3. A process for converting hydrocarbons which comprises passing a hydrocarbon stream upwardly through a dense turbulent fluidized bed of catalyst particles in a conversion zone in the lower portion of an enlarged vessel and said fluidized bed having a dilute phase of catalyst particles above its upper level and in said enlarged vessel, removing spent catalyst particles from said dense fluidized bed, passing essentially converted hydrocarbon vapors upwardly through said dilute phase of catalyst particles, passing a second stream of hydrocarbon vapors with admixed freshly regenerated catalyst particles upwardly through a separate transfer line reaction zone as a suspension to partially convert said admixed hydrocarbon vapors, passing a portion of the suspension of the partially converted hydrocarbon vapors and catalyst from the exit end of said transfer line reaction zone through a separation zone arranged in said enlarged vessel to separate spent catalyst particles from partially converted hydrocarbon vapors, admixing the last mentioned partially converted hydrocarbon vapors with the essentially converted vapors from said dense fluidized bed in said first conversion zone, passing another portion of the suspension of partially converted hydrocarbon vapors and catalyst particles from said transfer line reaction zone upstream from said catalyst separation zone and by-passing said catalyst separation zone, directly into said enlarged vessel and into dilute phase of catalyst particles above said dense fluidized bed of catalyst particles in said first mentioned conversion zone so that the partially converted vapors passing through said transfer line reaction zone are subjected to additional catalyst hold-up and further conversion of the hydrocarbon vapors is obtained by the combined effect of the catalyst particles in the dilute phase and the catalyst particles in said by-pass stream, separating entrained catalyst from converted hydrocarbon vapors in the upper portion of said enlarged vessel and recovering converted hydrocarbon vapors.

4. A process according to claim 3 wherein the catalyst bed level in said dense bed conversion zone is varied to vary the amount of catalyst particles in the dilute phase above said dense fluidized catalyst bed in said enlarged vessel.

5. A process according to claim 3 wherein said catalyst hold-up in said dense fluidized bed is between about 40 and 10 tons, said catalyst hold-up in said dilute catalyst phase is between about 0 and 1 ton and the catalyst hold-up in said transfer line reaction zone is 5 tons with no by-passing of catalyst from said transfer line reaction zone, and these catalyst hold-ups are changed by by-passing 0 to 30 tons per minute of catalyst particles from said transfer line reaction zone around said separation zone and directly into said dilute phase of catalyst particles so that the catalyst hold-up in said dilute catalyst phase adjacent said first separation zone is increased to between about 1 and 8 tons.

6. An apparatus of the character described including an elongated cylindrical vessel having a bottom outlet and a top outlet, a small vessel of a smaller diameter than said elongated cylindrical vessel and concentric with the vertical axis thereof to form an annular chamber between said vessels and communicating with said bottom outlet, said small vessel being arranged in the bottom portion of said elongated vessel only, means for introducing solids and gaseous material into the bottom portion of said small vessel to form a dense fluidized bed of solids in said small vessel which fluidized bed is adapted to flow into said annular chamber, an elongated transfer line reactor vessel exterior to said elongated vessel and having its upper portion extending into said elongated cylindrical vessel at about halfway between the top and bottom of said elongated vessel, means for introducing solids and gaseous material into the inlet end of said transfer line reactor vessel, rough cut cyclone separator means in said elongated vessel and connected to the exit end of said transfer line reactor vessel for separating solids from gaseous material passing to said rough cut cyclone separator means, said rough cut cyclone separator means being about halfway between the top and bottom of said elongated vessel, dipleg means for returning separated solids from said rough cut cyclone separator means to said annular chamber and cyclone separating means in the upper portion of said elongated vessel for separating solids from the gaseous material before it leaves said elongated vessel through said top outlet and for returning separated solids to said annular chamber.

7. An apparatus according to claim 6 wherein the upper portion of said transfer line reactor vessel adjacent said elongated vessel is provided with a valved by-pass line opening into the interior of said elongated vessel adjacent said rough cut cyclone separator means whereby solids and gaseous material from said transfer line reactor vessel can be by-passed around said rough cut cyclone separator means and passed directly into said elongated vessel in the region above said small vessel.

8. An apparatus according to claim 6 wherein a pipe is provided for communicating with the interior of said rough cut cyclone separator means whereby gas may be passed through said pipe into said cyclone separator means to increase the velocity of the gaseous material passing through said rough cut cyclone separator means to thereby reduce the efficiency of said rough cut cyclone separator means.

9. An apparatus according to claim 6 wherein said pipe is attached to the dipleg of said rough cut cyclone separator means.

10. A process for converting hydrocarbons which comprises:

(1) passing a first hydrocarbon stream into an enlarged vessel having
   (a) an upper portion,
   (b) a lower portion,
   (c) a first conversion zone comprising a dense turbulent fluidized bed of catalyst particles in said lower portion, and
   (d) a second conversion zone comprising a dilute phase of catalyst particles situated in said upper portion above said first conversion zone, said first conversion zone being surrounded by an annular stripping zone;

(2) removing spent catalyst particles from said first conversion zone;

(3) passing essentially converted hydrocarbon vapors upwardly through said second conversion zone;

(4) passing a second hydrocarbon stream containing admixed freshly regenerated catalyst particles upwardly through a separate transfer line reaction zone as a suspension to partially convert said second hydrocarbon stream;

(5) passing a portion of said partially converted second hydrocarbon stream and admixed catalyst particles from the exit end of said transfer line reaction zone through a separation zone comprising at least one cyclone separator arranged in said enlarged vessel to separate spent catalyst particles from said partially converted second hydrocarbon stream;

(6) varying the catalyst bed level in said first conversion zone to vary the amount of catalyst particles in said second conversion zone by changing the catalyst level in said annular stripping zone to thereby change the catalyst level in the dipleg of said cyclone separator;

(7) admixing the partially converted second hydrocarbon stream with the essentially-converted hydrocarbon vapors from said first conversion zone;

(8) passing another portion of said partially converted second hydrocarbon stream and admixed catalyst particles from said transfer line reaction zone, as a stream by-passing said separation zone, directly into said second conversion zone, thereby subjecting the partially converted vapors passing through said transfer line reaction zone to additional catalyst hold-up and further conversion of the hydrocarbon vapors due to the combined effect of the catalyst particles in said second conversion zone and the catalyst particles in said by-pass stream;

(9) separating entrained catalyst particles from converted hydrocarbon vapors present in said upper portion of said enlarged vessel; and

(10) recovering converted hydrocarbon vapors.

References Cited
UNITED STATES PATENTS

| | | | |
|---|---|---|---|
| 2,763,601 | 8/1956 | Martin et al. | 208—48 |
| 2,799,095 | 7/1957 | May et al. | 208—153 |
| 2,875,147 | 2/1959 | Engle | 208—164 |
| 2,881,129 | 4/1959 | Andrews et al. | 208—153 |

HERBERT LEVINE, *Primary Examiner.*

DELBERT E. GANTZ, *Examiner.*